United States Patent [19]

Lieffers

[11] 4,259,300

[45] Mar. 31, 1981

[54] INTEGRATED METHOD FOR POLLUTION ABATEMENT AND ENERGY DERIVATION FROM GEOTHERMAL STEAM

[75] Inventor: William C. Lieffers, Fullerton, Calif.

[73] Assignee: Union Oil Company of California, Brea, Calif.

[21] Appl. No.: 123,698

[22] Filed: Feb. 22, 1980

[51] Int. Cl.$^3$ .............................................. B01D 53/34
[52] U.S. Cl. ..................................... 423/224; 423/230; 423/238; 423/539; 60/641; 423/573 G
[58] Field of Search ................ 423/220, 230, 236, 238, 423/231, 224, 226, 237, 539, 573.6; 60/641

[56] References Cited

U.S. PATENT DOCUMENTS

| | | | |
|---|---|---|---|
| 4,016,075 | 4/1977 | Wilkins | 423/659 R X |
| 4,088,743 | 5/1978 | Hass et al. | 423/539 |
| 4,123,506 | 10/1978 | Spevack | 423/566 |
| 4,151,260 | 4/1979 | Woertz | 423/224 |
| 4,163,044 | 7/1979 | Woertz | 423/234 |

OTHER PUBLICATIONS

Weinberg, "The Geysers Power Plant H2S Abaterent Research and Development", Geothermal Energy Magazine, vol. 7, No. 6, Jun. 1979, pp. 42–43.
Birsic, "The Geysers–Geothermal Wonder of the World", Pacific Oil World, Mar., 1979, pp. 10–12.
Castrantas, "The Use of Hydrogen Peroxide to Abate Hydrogen Sulfide in Goethermal Operations", Paper SPE 7882, presented at the 1979 SPE of AIME International Symposium on Oilfield and Geothermal Chemistry, Houston, Texas, 1979.
The Geothermal Resource, Petroleum Information Corporation, 1979, pp. 46–49 and 100–103.
"Environmental Analysis for Geothermal Energy Development in the Geyser Region", Executive Summary by SPI International, May, 1978, pp. 10–13.
Coory et al, "Removing H2S from Geothermal Steam", Chemical Engineering Progress, Sep. 1977, pp. 93–98.
Laszlo, "Application of the Stretford Process for H2S Abatement at the Geysers Geothermal Power Plant", 11th Inter Society Energy Conversion Engineering Conference, 1976, pp. 724–730.
Allen et al., "Abatement of Hydrogen Sulfide Emissions from the Geyers Geothermal Power Plant", Second United Nations Symposium on the Development and Utilization of Geothermal Resources, 1975, pp. 1313–1315.
Li et al, "Removal of Hydrogen Sulfide from Geothermal Steam", Battele, Pacific Northwest Laboratories.
Kuwada, "Pollution Control for Geothermal Power Plants", AICHE Symposium Series, pp. 772–776, 1973.

*Primary Examiner*—Earl C. Thomas
*Attorney, Agent, or Firm*—Dean Sandford; Daniel R. Farrell

[57] ABSTRACT

An integrated method for the derivation of useful energy from steam containing both hydrogen sulfide and an alkaline acting component, such as ammonia, while substantially reducing the emission of sulfur-containing compounds to the atmosphere. Pretreatment of the steam to selectively remove the alkaline acting components results in the concentration of hydrogen sulfide in the uncondensed vapor as the steam is condensed during energy derivation. The uncondensed vapor is separated from the steam condensate and then is treated to produce an environmentally acceptable vent gas.

15 Claims, 2 Drawing Figures

INTEGRATED METHOD FOR POLLUTION ABATEMENT AND ENERGY DERIVATION FROM GEOTHERMAL STEAM

BACKGROUND OF THE INVENTION

1. Field of the Invention

This invention relates to the derivation of useful energy from hydrogen sulfide-containing steam, and more particularly to the reduction of the emissions of sulfur-containing compounds to the atmosphere as a result of the derivative of useful energy from steam containing both hydrogen sulfide and one or more alkaline acting components.

2. Description of the Prior Art

As conventional hydrocarbon fuel resources have become less abundant and more expensive, a worldwide emphasis has been placed on the development of alternative energy resources, such as geothermal energy resources. Electricity and other forms of useful energy can be derived from geothermal resources by producing geothermal steam and/or aqueous geothermal liquids from a subterranean geothermal reservoir and processing the produced geothermal fluid in surface facilities to extract thermal energy therefrom. Of particular interest is the generation of electricity by passing geothermal steam through a steam turbine/generator.

Most geothermal fluids contain appreciable quantities of noncondensable gases, such as hydrogen sulfide, carbon dioxide, ammonia, boric acid and the like. The presence of hydrogen sulfide in the geothermal fluid used for the derivation of useful energy often poses an environmental problem because only minute amounts of hydrogen sulfide can be acceptably discharged into the atmosphere.

Various processing methods have been proposed for the abatement of hydrogen sulfide emissions resulting from the derivation of energy from geothermal resources. One proposed method involves pretreating the motive geothermal steam to reduce the hydrogen sulfide content of the steam and then deriving useful energy from the pretreated steam. Such pretreatment methods are disclosed in U.S. Pat. Nos. 4,163,044 to Woertz and 4,123,506 to Spevak. However, these proposed pretreatment methods appear to be relatively expensive and may not result in sufficient abatement of the hydrogen sulfide emissions at a reasonable cost. It has also been proposed to treat only the noncondensable gases separated from the steam turbine effluent to remove hydrogen sulfide by means of a conventional hydrogen sulfide removal process, such as the Stretford process. These conventional processes are capable of converting very large fractions of the hydrogen sulfide in the gases treated to elemental sulfur or other useful sulfur-containing compounds. It has been found, however, that a substantial fraction of the hydrogen sulfide in the effluent from the steam turbine will not readily separate from the steam condensate with the uncondensed vapor and, as a result, this substantial fraction of hydrogen sulfide bypasses the hydrogen sulfide removal process and is eventually emitted to the atmosphere from the steam condensate. Various methods have been proposed to treat the effluent from the steam turbine and/or the steam condensate directly, such as by addition of a noncatalytic oxidant, such as hydrogen peroxide, or a catalytic oxidant, such as a ferric salt or a chelated ferric salt, to the hydrogen sulfide-containing liquid. However, these latter processes have been found to be unacceptably expensive both in terms of high chemical costs and in terms of increased corrosion and other downstream operating problems. Thus, a need exists for an economic and practical method for reducing the emissions of sulfur-containing compounds to the atmosphere resulting from the derivation of useful energy from hydrogen sulfide-containing steam.

Accordingly, a primary object of this invention is to provide a method for reducing the emission of sulfur-containing compounds to the atmosphere as a result of the derivation of useful energy from hydrogen sulfide-containing steam.

Another object of the invention is to provide a simple but effective method by which the emission of sulfur-containing compounds to the atmosphere as a result of the generation of electricity from geothermal steam is abated by means of the known, highly efficient processes for removing hydrogen sulfide from hydrogen sulfide-containing gases.

Still another object of the invention is to provide an integrated energy derivation and pollution abatement method by which useful energy can be efficiently derived from hydrogen sulfide-containing geothermal steam while substantially reducing the emission of sulfur-containing compounds to the atmosphere.

Further objects, advantages and features of the invention will become apparent to those skilled in the art from the following description taken in conjunction with the accompanying drawings.

SUMMARY OF THE INVENTION

Briefly, the invention provides an integrated method for the derivation of useful energy from steam containing both hydrogen sulfide and one or more alkaline acting components, such as ammonia, while substantially reducing the emission of sulfur-containing compounds to the atmosphere. The steam is pretreated to selectively remove the alkaline acting components without any significant removal of hydrogen sulfide. Useful energy is then derived from the treated steam thereby condensing the steam. In the absence of the alkaline acting components, the hydrogen sulfide will be concentrated in the uncondensed vapor which is separated from the steam condensate. The uncondensed vapor is then treated to remove the hydrogen sulfide and thereby produce a treated gas of reduced sulfur content. At least a portion of the treated gas is vented to the atmosphere. Preferably, the raw steam is contacted with an aqueous acidic solution to selectively remove the alkaline acting components without removing any significant amount of hydrogen sulfide.

The amount of alkaline acting components removed in the steam pretreatment step is controlled such that the uncondensed vapor separated from the steam condensate contains a desired substantial portion, such as 80 percent or more, of the total hydrogen sulfide in the raw steam. This concentration of the hydrogen sulfide in the uncondensed vapor allows a substantial reduction in the overall emissions of sulfur-containing compounds to be achieved using known methods for removal of hydrogen sulfide from gas streams and typically eliminates the need to treat the steam condensate. Further, this substantial reduction in emissions is achieved at a minimum of chemical cost and without significantly reducing the amount of useful energy derived from the steam. The method of this invention is particularly suited for the abatement of hydrogen sulfide emissions resulting from the generation of electricity from geothermal steam.

BRIEF DESCRIPTION OF THE DRAWINGS

The invention will be more readily understood by reference to the drawings, wherein like numerals refer to like elements, and in which.

DETAILED DESCRIPTION OF THE INVENTION

Figure 1:
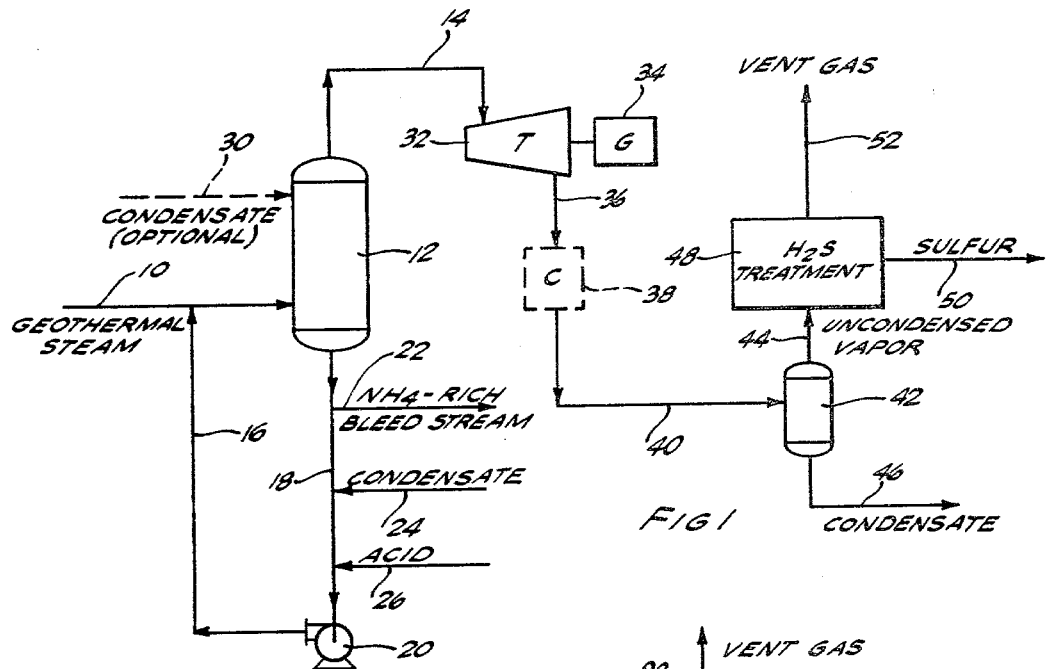
FIGS. 1 and 2 are schematic flow diagrams illustrating preferred embodiments of the method of this invention.

The method of this invention is applicable to the derivation of useful energy from steam containing both hydrogen sulfide and one or more alkaline acting components, such as ammonia. As used herein, the term "alkaline acting component" means a compound which, when dissolved in pure water, forms an aqueous alkaline solution capable of absorbing acid gases, such as hydrogen sulfide and/or carbon dioxide. The method of this invention is particularly suited to the derivation of useful energy from geothermal steam containing both hydrogen sulfide and ammonia, such as the dry geothermal steam produced from The Geysers geothermal steam reservoir in California or geothermal steam which is produced from subterranean reservoirs containing geothermal brines. The method of this invention is also applicable to a wide variety of energy derivation methods including using the thermal energy of steam for space or process heating and using steam in a steam turbine to produce mechanical energy. Of course, steam-driven engines other than steam turbines may also be used and wherever the term "steam turbine" is used herein it should be understood to include all such steam-driven engines.

The method of this invention is particularly suited to the generation of electricity using steam. While the invention will be described with respect to the generation of electricity using geothermal steam, the invention is, of course, not so limited.

The geothermal steam produced at The Geysers is exemplary of the steam which can be successfully employed in the method of this invention. The Geysers geothermal steam typically contains between about 0.1 and about 3.4 weight percent of noncondensable gases with the ranges of concentrations and average concentrations of individual gases as indicated in the following table:

TABLE

| Gas* | Parts per Million by Weight | |
|---|---|---|
| | Range | Average |
| Carbon dioxide | 290–30,600 | 3,260 |
| Hydrogen sulfide | 5–1,060 | 222 |
| Methane | 13–1,447 | 194 |
| Ammonia | 9–1,060 | 194 |
| Nitrogen | 6–638 | 52 |
| Hydrogen | 11–218 | 56 |
| Ethane | 3–19 | Negligible |

*Source: Allen, G. W. and McCluer, H. K., "Abatement of Hydrogen Sulfide Emissions from The Geysers Geothermal Power Plant," Second United Nations Symposium on the Development and Utilization of Geothermal Resources, 1975, pages 1313–1315.

In conventional practice, the geothermal steam is passed through a steam turbine to derive useful energy and the effluent from the steam turbine is cooled by heat exchange with water in a direct contact condensor or a surface condensor to condense substantially all of the steam and thereby form steam condensate. The steam condensate is then separated from uncondensed vapor comprised of principally noncondensable gases and some water vapor. Under commercial operating conditions, it has been found that a substantial portion of the hydrogen sulfide will be contained in the steam condensate. Typically, about 35 percent of the total hydrogen sulfide will be contained in the steam condensate when a surface condensor is employed to condense the effluent from the steam engine and as much as 85 percent or more of the hydrogen sulfide will be contained in the steam condensate when a direct contact condensor is employed. This substantial portion of the hydrogen sulfide bypasses any hydrogen sulfide abatement process used to treat the uncondensed vapor and is typically emitted to the atmosphere when stripped from the steam condensate, such as during the evaporative cooling of the steam condensate in a cooling tower. Although the steam condensate could be treated to abate the hydrogen sulfide contained therein, the treatment methods which have been attempted are unsatisfactory due to high chemical costs, low efficiency and downstream operating problems caused by the treatment methods.

I have discovered that the portion of the hydrogen sulfide contained in the steam condensate can be substantially reduced by treatment of the steam upstream of the steam turbine to selectively remove alkaline acting components, principally ammonia, contained in the steam. Selective removal of the alkaline acting components serves to concentrate the hydrogen sulfide in the uncondensed vapor where it can be conveniently treated by a known hydrogen sulfide abatement process. By proper selection of the steam pretreatment conditions, it is possible to reduce the amount of hydrogen sulfide in the steam condensate to 20 percent or less of the total hydrogen sulfide in the effluent from the steam turbine, preferably 10 percent or less. If all alkaline acting components are removed in the pretreatment step, under typical operating conditions the amount of hydrogen sulfide in the steam condensate could be reduced to about 5 percent of the total hydrogen sulfide when a direct contact condensor is employed and could be reduced in about 1 percent of the total hydrogen sulfide when a surface condensor is employed. However, for economic reasons it may be desirable, as a practical matter, to remove less than all of the alkaline acting components in the pretreatment step. Preferably the amount of alkaline acting components removed in the pretreatment step is selected so that at least about 80 percent of the total hydrogen sulfide in the effluent from the steam turbine is concentrated in the uncondensed vapor, more preferably at least about 90 percent.

Although any method of selectively removing the alkaline acting components from the steam can be employed to pretreat the steam in the method of this invention, the presently preferred method is to contact the steam with an aqueous acidic washing solution capable of absorbing the alkaline acting components of the steam without absorbing any significant amount of hydrogen sulfide. The washing solution can be sprayed into contact with the steam upstream of a separator designed to separate any liquid from the steam or, if required, the steam can be contacted with the washing solution in a conventional steam scrubber. The particular contacting method employed is a matter of choice made in view of various factors well known to those skilled in the art.

Preferably, the washing solution is a relatively dilute aqueous acidic solution which is not excessively corrosive under the conditions employed. The required pH of the solution will depend upon the absorption characteristics of the alkaline acting components with respect to those of hydrogen sulfide so as to absorb the alkaline acting components and reject the hydrogen sulfide. The pH of the solution should be selected to effect the required separation and with regard to the materials of the pretreatment equipment so as not to be excessively corrosive. Preferably, the washing solution has a pH between about 1 and about 5. The washing solution should be free of any species which would react with hydrogen sulfide or other components of the steam to form solids. For example, the washing solution should be free of metal salts of the type disclosed in U.S. Pat. No. 4,123,506 which are capable of reacting with hydrogen sulfide to form metal sulfide precipitates or elemental sulfur. In one embodiment, the washing solution is an aqueous carbonic acid solution formed by dissolving in steam condensate carbon dioxide from the vent gas remaining after hydrogen sulfide removal. Depending upon the operating conditions employed in the steam pretreatment step, ammonia may be absorbed into the solution and converted to ammonium bicarbonate or carbonate in a satisfactory manner. Any carbon dioxide evolved from the washing solution will pass innocuously through the system.

Preferably, however, the washing solution is a simple aqueous solution containing a nonvolatile acid, such as is formed by dissolving a nonvolatile acid in pure water or steam condensate. The washing solution may, of course, also contain various nonreactive salts, such as the ammonium salts of the nonvolatile acids formed as ammonia is absorbed into the washing solution. As used herein, the term "nonvolatile acid" means a compound which dissociates in water to yield hydronium ions and which does not volatilize or decompose under the conditions employed in the steam pretreatment step. Further, the nonvolatile acid must be capable of forming water-soluble ammonium salts which are stable in solution at the conditions employed in the pretreatment step. Suitable nonvolatile acids include both inorganic acids, such as sulfuric acid, sulfurous acid, phosphoric acid and the like, and organic acids, such as glycolic acid, citric acid and the like. An exemplary washing solution is an aqueous solution containing between about 0.1 and about 0.5 weight percent of sulfuric acid. The concentration of the nonvolatile acid and the flow rate of the washing solution that is required will depend on the concentration of the alkaline acting components and the flow rate of the steam so as to achieve the removal of the desired amount of alkaline acting components. Preferably, the nonvolatile acid is introduced in at least about a 1:1 molar ratio of acid to the amount of alkaline acting components to be removed. For example, where a sulfuric acid solution is used to remove ammonia from steam and it is desired to form ammonium bisulfate, at least about 1.0 mole of sulfuric acid should be introduced for each mole of ammonia to be removed. Molar ratios of acid to alkaline acting component between about 1.5:1 and about 3:1 are preferred.

The aqueous washing solution may also contain various other compounds providing they do not interfere with the absorption of ammonia from the steam and do not react with hydrogen sulfide or other constituents of the steam or washing solution to form solids. For example, minor amounts, such as a few parts per million, of a corrosion inhibitor or a chelating agent may be advantageously added to the washing solution.

Referring now to the preferred embodiment of the invention illustrated in FIG. 1, geothermal steam containing both hydrogen sulfide and ammonia is conducted through conduit 10 into a lower section of vessel 12 and passes upwardly through vessel 12 to exit through conduit 14. An aqueous acidic washing solution is introduced from conduit 16 into conduit 10 wherein it contacts the geothermal steam and selectively absorbs ammonia from the steam. Devices, such as baffles or static mixing elements, may be incorporated in conduit 10 to enhance contact between the washing solution and the steam. Upon entering vessel 12, the washing solution, which now contains the absorbed ammonia in the form of water-soluble ammonium salts, is separated from the pretreated steam and exits from vessel 12 through conduit 18. Preferably, at least a portion of the washing solution is recirculated by means of pump 20 through conduit 16 into contact with additional steam in conduit 10. As ammonium salts accumulate in the recirculated washing solution, a portion of the ammonium-rich solution will be bled from the recirculating solution through conduit 22 for sale as fertilizer, for disposal, or the like. Steam condensate and acid are added through conduits 24 and 26, respectively, or a premixed acidic solution can be added as required to replace water and acid in the recirculating washing solution.

After removal of the ammonia, the pretreated steam exits from the top of vessel 12 through conduit 14. Optionally, steam condensate or other aqueous liquid can be introduced through conduit 30 into an upper section of vessel 12 which is adapted for scrubbing the pretreated steam to remove any entrained droplets of the acidic washing solution. Thus, vessel 12 can be a simple vapor/liquid separator or a combination separator and steam scrubber with contacting trays or the like. Preferably, vessel 12 is designed according to factors well known in the art to minimize the amount of enthalpy lost from the steam in passage therethrough, i.e., heat and pressure losses should be minimized to avoid a loss of recoverable energy.

The pretreated steam which still contains substantially all of the hydrogen sulfide is conducted through conduit 14 into the inlet of steam turbine 32. In passage through steam turbine 32, the pretreated steam is expanded and a portion of the steam may be condensed to form steam condensate. Passage of the pretreated steam through steam turbine 32 provides the motive power to turn generator 34 thereby generating electricity. Optionally, the effluent from steam turbine 32 is conducted through conduit 36 to condensor 38 wherein the effluent is cooled to condense additional steam. Condensor 38 can be any type of condensor, such as a direct contact condensor in which steam is condensed by direct contact with a recycled stream of cold steam condensate or a surface condensor in which the steam is condensed by indirect heat exchange with a cold fluid, such as cooling tower water. A two-phase fluid comprising (1) steam condensate and (2) uncondensed vapor containing a substantial portion of the total hydrogen sulfide is then conducted through conduit 40 into vapor/liquid separator 42.

Separator 42 can be any conventional vapor/liquid separator and may be operated at atmospheric pressure, a superatmospheric pressure or a subatmospheric pressure. Although illustrated as a single vessel separate from condensor 38, condensor 38 and separator 42 can be a single integrated vessel. Preferably separator 42 is operated at subatmospheric pressure and steam ejectors or the like, not shown, are used to withdraw the uncondensed vapor from separator 42. In separator 42, the steam condensate is separated from the uncondensed vapor. Due to the removal of ammonia in the pretreatment step, a substantial portion of the total hydrogen sulfide will be contained in the uncondensed vapor exiting from separator 42 through conduit 44. Steam condensate which contains only a minor portion of the hydrogen sulfide is conducted from separator 42 through conduit 46 for use, such as for use as cooling tower water make up, or for disposal, such as by reinjection into the geothermal reservoir.

The hydrogen sulfide-containing uncondensed vapor is conducted through conduit 44 to a selected process for removal of hydrogen sulfide, indicated by box 48. Preferably, the hydrogen sulfide removal process is one which converts the hydrogen sulfide to a valuable product, such as elemental sulfur, which is then recovered through conduit 50. In the embodiment illustrated in FIG. 1, the hydrogen sulfide removal process removes sufficient hydrogen sulfide from the uncondensed vapor so as to form a vent gas of acceptably low sulfur content which is then vented through conduit 52 to the atmosphere.

Various of the known processes for removing hydrogen sulfide from hydrogen sulfide-containing gas streams can be successfully employed in the method of this invention to remove hydrogen sulfide from the uncondensed vapor. Among the processes which are suitable are those processes in which hydrogen sulfide is absorbed from the gas stream by contact with an aqueous regenerable washing solution and the absorbed hydrogen sulfide is converted primarily to elemental sulfur, such as the Ferrox process, the Takahax process and the Stretford process. Of these, the Stretford process is preferred due to its relatively efficient conversion of the absorbed hydrogen sulfide to elemental sulfur. Other suitable processes include those processes in which hydrogen sulfide-containing gases are treated in one or more catalytic stages to oxidize the hydrogen sulfide to elemental sulfur, which is then recovered, and/or to sulfur oxides, which can be absorbed in water to form sulfurous or sulfuric acid solutions. One such process is disclosed in U.S. Pat. No. 4,088,743, wherein the hydrogen sulfide-containing gas is passed over a vanadium catalyst in a first catalytic stage to selectively oxidize a major portion of the hydrogen sulfide to elemental sulfur, which is then recovered, and the effluent gas is then passed over a vanadium catalyst in a second catalytic stage to catalytically incinerate the remaining sulfur-containing constituents of the effluent gas to form gaseous sulfur dioxide. The sulfur dioxide-containing gas can then be vented to the atmosphere or, if required, can be scrubbed to remove the sulfur dioxide. The disclosure of U.S. Pat. No. 4,088,743 is herein incorporated by reference.

A particularly preferred process for treating the hydrogen sulfide-containing uncondensed vapor in the method of this invention involves three catalytic stages. In the first catalytic stage, the uncondensed vapor and a stoichiometric amount of air are passed over a selective oxidation catalyst to selectively convert a major portion of the hydrogen sulfide to elemental sulfur. In this first stage, preferably about 50 percent or more of the hydrogen sulfide is converted to elemental sulfur which is then separated from the reactor effluent. The reactor effluent containing unreacted hydrogen sulfide and some sulfur dioxide is then passed over a conventional alumina Claus-type catalyst in a second stage to form additional elemental sulfur by the Claus reaction. An additional amount, such as about 35 percent, of the total hydrogen sulfide is preferably recovered as elemental sulfur for this second catalytic stage. Finally, the remaining gas is passed over a selective oxidation catalyst with excess air to catalytically incinerate all the remaining sulfur compounds to sulfur dioxide. The sulfur dioxide-containing incinerated gas can be vented to the atmosphere or, preferably, can be scrubbed with steam condensate to remove sulfur dioxide from the gas to form a vent gas and simultaneously form an aqueous sulfurous acid solution which can be used as the washing solution in the steam pretreatment step.

Figure 2:
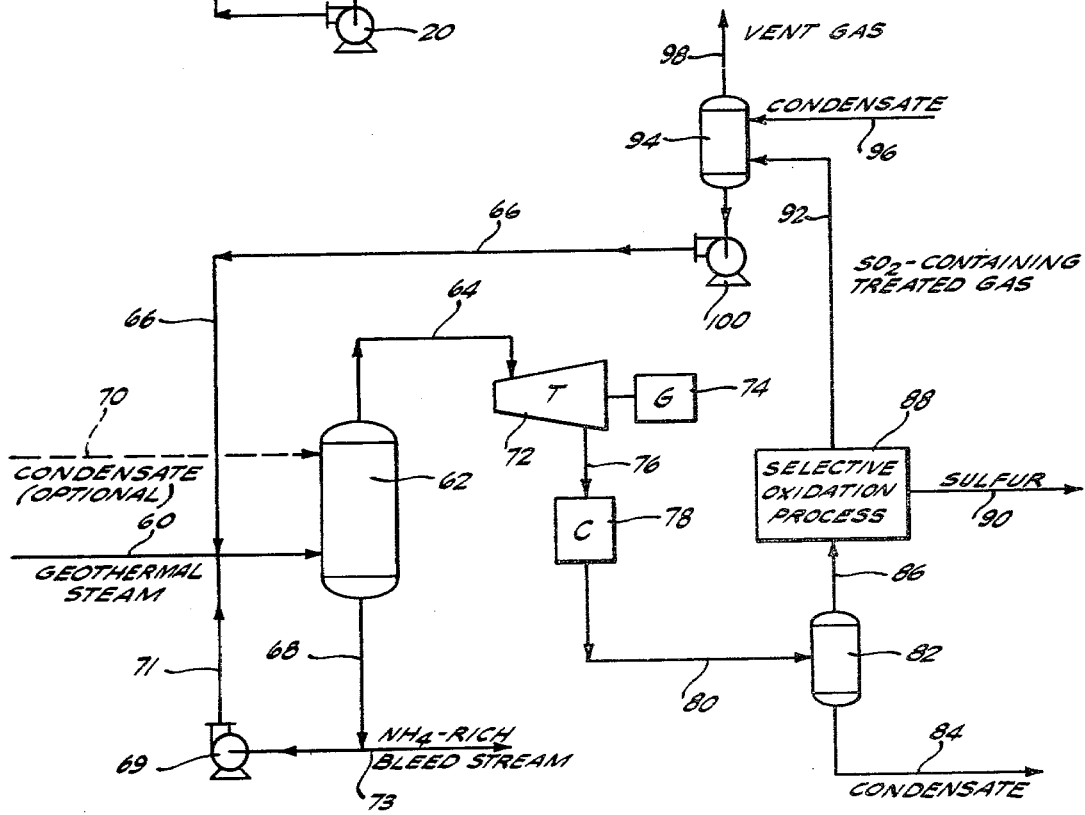

In the particularly preferred embodiment of the method of this invention illustrated in FIG. 2, geothermal steam containing both hydrogen sulfide and ammonia is conducted through conduit 60 into vessel 62 and passes upwardly through vessel 62 to exit through conduit 64. An aqueous sulfurous acid washing solution is introduced through conduit 66 into conduit 60 wherein the washing solution contacts the geothermal steam and selectively absorbs ammonia therefrom. The washing solution containing the absorbed ammonia in the form of water-soluble ammonium salts is separated from the steam in vessel 62 and exits from vessel 62 through conduit 68. A portion of this solution is preferably recycled by pump 69 through conduit 71 into conduit 60 and an ammonium-rich bleed stream is removed through conduit 73. The ammonium-containing bleed stream can be used as cooling tower make up or can be sent to disposal. Optionally, steam condensate is introduced through conduit 70 into a steam scrubbing section of vessel 62 to remove any entrained washing solution from the pretreated steam.

The pretreated steam is conducted through conduit 64 to the inlet of steam turbine 72 and is passed through steam turbine 72 so as to drive generator 74 and thereby generate electricity. The effluent from steam turbine 72 is conducted by conduit 76 to condensor 78 which can be a surface condensor or a direct contact condensor. Substantially all of the geothermal steam is condensed in passage through steam turbine 72 and condensor 78 to form a two-phase fluid comprised of steam condensate and uncondensed vapor. Due to the removal of ammonia in the steam pretreatment step, the hydrogen sulfide is concentrated primarily in the uncondensed vapor with only a minor portion of the hydrogen sulfide being contained in the steam condensate. The two-phase fluid is conducted through conduit 80 to separator 82 wherein the steam condensate is separated from the uncondensed vapor. The steam condensate exits from separator 82 through conduit 84 and can be used in the process or can be sent to disposal.

The uncondensed vapor exits from separator 82 through conduit 86 and is treated by one of the selective oxidation processes described above, as indicated by box 88, to selectively oxidize the hydrogen sulfide to elemental sulfur which is recovered via conduit 90 and to incinerate the residual sulfur-containing compounds to form a sulfur dioxide-containing treated gas. The treated gas is conducted through conduit 92 to scrubber 94 wherein it is contacted with steam condensate introduced through conduit 96 to remove sulfur dioxide from the treated gas and form a vent gas of reduced sulfur content. The vent gas is vented to the atmosphere through conduit 98. In scrubbing the sulfur dioxide from the vent gas an acidic solution of sulfurous acid is produced. The aqueous sulfurous acid solution is pumped by pump 100 through conduit 66 for use in the aqueous washing solution in the steam pretreatment step.

It is contemplated that the steam condensate recovered from separator 42 or 82 may be treated to remove even the relatively small amount of hydrogen sulfide remaining therein. However, it is preferred to adjust the steam pretreatment step so as to minimize the amount of hydrogen sulfide in the steam condensate. In this manner, treatment of the hydrogen sulfide will typically not be required and, even where required, the treatment of the steam condensate will be minimized.

While particular embodiments of the invention have been described, it will be understood, of course, that the invention is not limited thereto since many obvious modifications can be made, and it is intended to include any such modifications as will fall within the scope of the appended claims.

Having now described the invention, I claim:

1. A method for reducing the emission of sulfur-containing compounds to the atmosphere as a result of the derivation of useful energy from steam containing both hydrogen sulfide and one or more alkaline acting components, said method comprising:
   (a) treating said steam so as to selectively remove at least a portion of the alkaline acting components from said steam and thereby form treated steam containing substantially all of said hydrogen sulfide;
   (b) deriving useful energy from said treated steam and condensing at least a portion of said steam to form a hydrogen sulfide-containing two-phase fluid comprising steam condensate and uncondensed vapor;
   (c) separating said uncondensed vapor from said steam condensate;
   (d) treating said uncondensed vapor to remove hydrogen sulfide from said uncondensed vapor and thereby form a vent gas having a low concentration of sulfur-containing compounds; and
   (e) venting at least a portion of said vent gas to the atmosphere.

2. The method defined in claim 1 wherein the amount of said alkaline acting components removed from said steam in step (a) is controlled such that the uncondensed vapor separated in step (c) contains at least about 80 percent of the total hydrogen sulfide in said two-phase fluid.

3. The method defined in claim 1 wherein the amount of said alkaline acting components removed from said steam in step (a) is controlled such that the uncondensed vapor separated in step (c) contains at least about 90 percent of the total hydrogen sulfide in said two-phase fluid.

4. The method defined in claim 1 wherein said uncondensed vapor is treated in step (d) to selectively oxidize said hydrogen sulfide primarily to elemental sulfur with the remainder of said hydrogen sulfide being converted to gaseous sulfur oxides.

5. The method defined in claim 1 wherein said uncondensed vapor is treated in step (d) by contact with an aqueous regenerable washing solution capable of absorbing said hydrogen sulfide from said vapor and converting the absorbed hydrogen sulfide primarily to elemental sulfur.

6. The method defined in claim 1 wherein said steam is treated in step (a) by contact with an aqueous acidic solution capable of absorbing said alkaline acting components without absorbing any significant amount of said hydrogen sulfide.

7. The method defined in claim 1 wherein said steam is geothermal steam and wherein said alkaline acting components comprise ammonia.

8. A method for reducing the emission of sulfur-containing compounds to the atmosphere as a result of the derivation of useful energy from geothermal steam containing both hydrogen sulfide and ammonia, said method comprising:
   (a) contacting said geothermal steam with an aqueous acidic washing solution so as to selectively absorb a selected amount of said ammonia from said geothermal steam and thereby form treated steam containing substantially all of said hydrogen sulfide;
   (b) passing said treated steam through a steam turbine to derive useful energy and condensing at least a portion of said steam to form a hydrogen sulfide-containing two-phase fluid comprising steam condensate and uncondensed vapor, the amount of ammonia removed in step (a) being controlled such that said uncondensed vapor contains at least about 80 percent of the total hydrogen sulfide in said two-phase fluid;
   (c) separating said uncondensed vapor from said steam condensate;
   (d) treating said uncondensed vapor to remove hydrogen sulfide from said uncondensed vapor and thereby form a treated gas having a substantially lower concentration of sulfur-containing compounds than said uncondensed vapor; and
   (e) venting at least a portion of said treated gas to the atmosphere.

9. The method defined in claim 8 wherein the amount of ammonia removed in step (a) is controlled such that the uncondensed vapor separated in step (c) contains at least about 90 percent of the total hydrogen sulfide in said two-phase fluid.

10. The method defined in claim 8 wherein said uncondensed vapor is treated in step (d) by selective catalytic oxidation of said hydrogen sulfide primarily to elemental sulfur with the remaining hydrogen sulfide in said uncondensed vapor being converted to gaseous sulfur oxides.

11. The method defined in claim 10 wherein said treated gas from step (d) contains said gaseous sulfur oxides, and wherein said treated gas is contacted with an aqueous liquid to absorb the gaseous sulfur oxides from said treated gas prior to venting said treated gas in step (e).

12. The method defined in claim 11 wherein the absorption of said sulfur oxides into said aqueous liquid results in the formation of an aqueous acidic solution, and wherein said aqueous acidic solution is used in step (a) as said aqueous acidic washing solution.

13. The method defined in claim 8 wherein said uncondensed vapor is treated in step (d) by contact with an aqueous regenerable washing solution capable of absorbing said hydrogen sulfide from said uncondensed vapor and converting the absorbed hydrogen sulfide primarily to elemental sulfur.

14. A method for reducing the emission of sulfur-containing compounds to the atmosphere as a result of the generation of electricity from geothermal steam containing both hydrogen sulfide and ammonia, said method comprising:

(a) contacting said geothermal steam with a dilute aqueous acidic washing solution so as to selectively absorb a selected amount of said ammonia from said geothermal steam and thereby form treated steam containing substantially all of said hydrogen sulfide;

(b) passing said treated steam through a steam turbine/generator and cooling the effluent from said steam turbine/generator, thereby generating electricity and condensing a major portion of said steam to form a hydrogen sulfide-containing two-phase fluid comprising steam condensate and uncondensed vapor, the amount of ammonia removed in step (a) being controlled such that said uncondensed vapor contains at least about 90 percent of the total hydrogen sulfide in said two-phase fluid;

(c) separating said uncondensed vapor from said steam condensate;

(d) catalytically treating said uncondensed vapor so as to selectively oxidize the hydrogen sulfide in said uncondensed vapor primarily to elemental sulfur with the remaining hydrogen sulfide being converted to gaseous sulfur oxides, thereby forming elemental sulfur and a treated gas containing said sulfur oxides;

(e) separating said elemental sulfur from said treated gas;

(f) contacting said treated gas with an aqueous scrubbing solution so as to absorb said sulfur oxides from said treated gas and thereby form a vent gas; and (g) venting said vent gas to the atmosphere.

15. The method defined in claim 14 wherein said scrubbing solution is selected so that upon absorption of said sulfur oxides an aqueous acidic solution is formed, and wherein said aqueous acidic solution is used in step (a) as said aqueous acidic washing solution.

* * * * *